United States Patent [19]
Parkhe et al.

[11] Patent Number: 5,321,544
[45] Date of Patent: Jun. 14, 1994

[54] ELECTROCHROMIC STRUCTURES AND METHODS

[75] Inventors: V. D. Parkhe, Edison; Forrest A. Trumbore, Summit; John E. Van Dine, Mahwah, all of N.J.

[73] Assignee: Sun Active Glass Electrochromics, Inc., Valley Cottage, N.Y.

[21] Appl. No.: 754,650

[22] Filed: Sep. 4, 1991

[51] Int. Cl.$^5$ .................. G02F 1/153; G02F 1/155
[52] U.S. Cl. .................. 359/273; 359/265; 359/266; 359/274; 359/275
[58] Field of Search ............ 359/266, 275, 273, 274, 359/265

[56] References Cited

U.S. PATENT DOCUMENTS

| | | |
|---|---|---|
| 3,589,896 | 6/1971 | Wilcox . |
| 3,682,528 | 8/1972 | Apfel et al. . |
| 3,712,710 | 1/1973 | Castellion et al. . |
| 4,053,209 | 10/1977 | Hara et al. . |
| 4,166,876 | 9/1979 | Chiba et al. . |
| 4,182,551 | 1/1980 | Washida et al. . |
| 4,226,910 | 10/1980 | Dahlen et al. . |
| 4,413,877 | 11/1983 | Suzuki et al. . |
| 4,462,883 | 7/1984 | Hart . |
| 5,007,718 | 4/1991 | Minoura et al. ............ 359/265 |
| 5,130,842 | 7/1992 | Gauthier et al. ............ 359/275 |
| 5,133,594 | 7/1992 | Haas et al. . |

FOREIGN PATENT DOCUMENTS

| | | | |
|---|---|---|---|
| 0105217 | 6/1983 | Japan ............ | 359/266 |
| 0277826 | 11/1989 | Japan ............ | 359/275 |
| 8912844 | 12/1989 | PCT Int'l Appl. ............ | 359/275 |
| 8909428 | 10/1989 | Sweden ............ | 359/275 |

Primary Examiner—Loha Ben
Assistant Examiner—Evelyn A. Lester
Attorney, Agent, or Firm—Lerner, David, Littenberg, Krumholz & Mentlik

[57] ABSTRACT

A chromogenic device with a chromogenic material facing a conductive layer, in which the transmission of incident radiation through the conductive layer and the chromogenic material is enhanced. The enhancement is achieved by adjusting indices of refraction of layers embracing the conductive layer.

28 Claims, 1 Drawing Sheet

ELECTROCHROMIC STRUCTURES AND METHODS

BACKGROUND OF THE INVENTION

This invention relates to electrochromic structures through which energy, including light, can be transmitted under controlled conditions, and more particularly, to large-area electrochromic structures for controlled energy transmission.

A variety of electrochromic materials are available for controlling the through-passage of energy. Such devices operate "chromatically" by producing a change in coloration in accordance with an applied stimulus or excitation.

Thus, a thermochromic device produces a color change in response to temperature. The resultant coloration of, for example, a sheet of material, depends upon the temperature to which the sheet is subjected. There is, however, the objection that a user has only limited control over the coloration since it is temperature dependent.

Another chromogenic device is "photochromic" in that its coloration depends upon the intensity of light that falls upon the device. When glass or other translucent materials are doped with iron oxide, a light-induced reaction produces increased darkening with increased intensity of light. Here again, the degree of coloration is dependent upon external effects.

Still another chromogenic device depends upon the extent to which an electrical stimulus is applied, and is said to be "electrochromic". In such devices the nature and extent of coloration depends upon an electrical effect.

Unfortunately, it has been difficult to produce economical large-scale chromogenic devices with useful optical properties. Thus, small-area devices have been produced for lenses (photochromic) and mirrors (electrochromic). However, it has been difficult to produce panels with large surfaces of the kind needed for vision applications such as windows and skylights.

Accordingly, it is an object of the invention to facilitate the manufacture and use of chromogenic structures. A related object is to facilitate large-scale chromogenic applications in which appreciable surface areas are required.

Still another object of the invention is to adapt chromogenic devices to light transmissive structures such as skylights and other arrangements that are intended to provide large-area control over natural illumination.

A further object of the invention is to facilitate the manufacture and use of electrochromic structures, particularly for relatively large-scale applications. In addition, the entrapment of radiant energy can produce a greenhouse effect. Accordingly, it is another object of the invention to provide electrochromic devices with a capability for reducing the extent to which sunlight and other forms of radiation produce solar heat gain in buildings and other structures.

Another object of the invention is to adapt electrochromic devices for widespread architectural and automotive applications, as well as aeronautic structures such as cockpits and avionic viewing surfaces.

Studies have been undertaken which relate various parameters of materials, and device configurations (e.g., area), to switching speed. Such studies are reported by J.P. Randine in Proc. SPIE IS4, 539 (1989) and Messrs. K-C. Ho, D.E. Singleton and C.B. Greenberg in Proc. Electrochem Soc. 90-2, 349 (1990). It has been predicted that as device area increases, the resistance of its transparent conducting layer is the major factor limiting switching time and uniformity of coloration or bleaching.

Accordingly, it is another object of the invention to counteract the increase in switching time and nonuniformity of coloration and bleaching in electrochromic devices as their areas increase.

One approach has been to add an electrically conducting grid structure in accordance with U.S. Pat. No. 4,768,865 of Greenberg and Singleton issued Sep. 6, 1988. This approach degrades the transmission of light and may be unsuitable where the objective is to attain high percentage transmission. The adverse effect of a grid structure can be significant, especially if multiple grids, one on top of each transparent conduction layer, are used to obtain the desired switching speed. It also is difficult to form grinds on non-planar surfaces.

According, a further object of the invention is to increase switching speeds for electrochromic structures and eliminate or minimize the use of electrical grids.

Accordingly, yet another object of the invention is to achieve fast switching, while maintaining a high light transmission, and relatively low cost and ease of manufacture.

SUMMARY OF THE INVENTION

In accomplishing the foregoing and related objects, the invention provides a relatively large-scale chromogenic device, by incorporating an index-adjusted structure to serve as at least one electrode of the device. Such a device can meet switching time and optical transmission requirements for architectural windows and other visual effects. Devices in accordance with the invention are easy to manufacture at low cost.

In accordance with another aspect of the invention, the at least one electrode consists of layered index-adjusted structure (LIAS) in which the refractive indices and thicknesses of the individual layers are controlled by controlling the materials and process parameters used to form the electrode, thereby producing an electrode having desirable electrical conductivity and transmission of optical radiation. As used herein, the term "layered index-adjusted structure" refers to an electrode formed from a plurality of layers, each of which has been particularly selected with regard to index of refraction and thickness so that the combination of the layers provides desired optical properties.

In accordance with a further aspect of the invention, parameters and materials are selected for an electrode comprising an LIAS along with parameters and materials for counterelectrodes (CE's), electrochromic electrodes (ECE's) and ion conductors (IC's) which will meet desirable switching speeds and transmission requirements for large-area electrochromic devices.

The invention includes provision for energizing individual electrochromic panels. Each such panel can be laminated to a transparent superstrate by, for example, an adhesive. The adhesive can be selected from a wide variety of substances including ethylene vinylacetate and polyvinyl butyral.

Each panel can be formed of successive layers on a substrate beginning with a transparent conductor, which desirably is a layered index-adjusted structure, which can include the electrochromic electrode. The next layer is an ion conductor, which is followed by a counterelectrode that also is desirably a part of a layered index-adjusted structure formed from transparent metallic and ceramic layers. Thus, separate layered index-adjusted structures can form upper and lower components of the device. Alternatively, a single, or multiple index-adjusted structures can be incorporated into the overall device as desired.

The electrochromic layer changes color when subjected to an electrical effect and faces the ion conducting layer. The counterelectrode is on the opposite face of the ion conducting layer and adjacent the transparent conductive material upon the counterelectrode.

The ion conductor is transparent in the visible range, preferably solid, with high electronic resistivity, and high ionic conduction. Lithium or hydrogen ion conductors are suitable. The lithium ion conductors include lithium silicates, lithium aluminum silicates, lithium borosilicates, lithium borates, lithium zirconium silicates, lithium niobates, and various lithium ion conducting polymer electrolytes. The hydrogen ion conductors are derived from such oxides such as tantalum pentoxide ($Ta_2O_5$) and silicon dioxide ($SiO_2$). The counterelectrode can be nickel oxide, iridium oxide, vanadium pentoxide, molybdenum oxide, or various mixed oxides.

In a method of manufacturing a relatively large-scale non-planar electrochromic device according to the invention, a non-planar substrate is combined with a set of layers, including an ion conducting layer and an electrochromic layer. The layers may be formed upon the substrate by chemical dipping, sputtering, thermal evaporation or thin film deposition techniques. These procedures can be combined and the resulting structure joined to a superstrate by adhesive lamination.

In a method of operating a relatively large-scale electrochromic device, electrical energy is applied between exterior and interior transparent conductive layers. This causes a migration of ions among a counterelectrode, an ion conductor and an electrically responsive coloration layer. Exterior energy, such as light, ultraviolet and infrared radiation, is transmitted through a transparent substrate to the interior transparent conductive layer. The voltage controlled coloration determines the extent to which the exterior energy is further transmitted from the interior transparent conductive layer through the electrically responsive coloration layer, the ion conductor, the counterelectrode and out of the exterior transparent conductive layer.

DESCRIPTION OF THE DRAWINGS

Other aspects of the invention will become apparent after considering several illustrative embodiments, taken in conjunction with the drawings in which.

DETAILED DESCRIPTION

Figure 1:
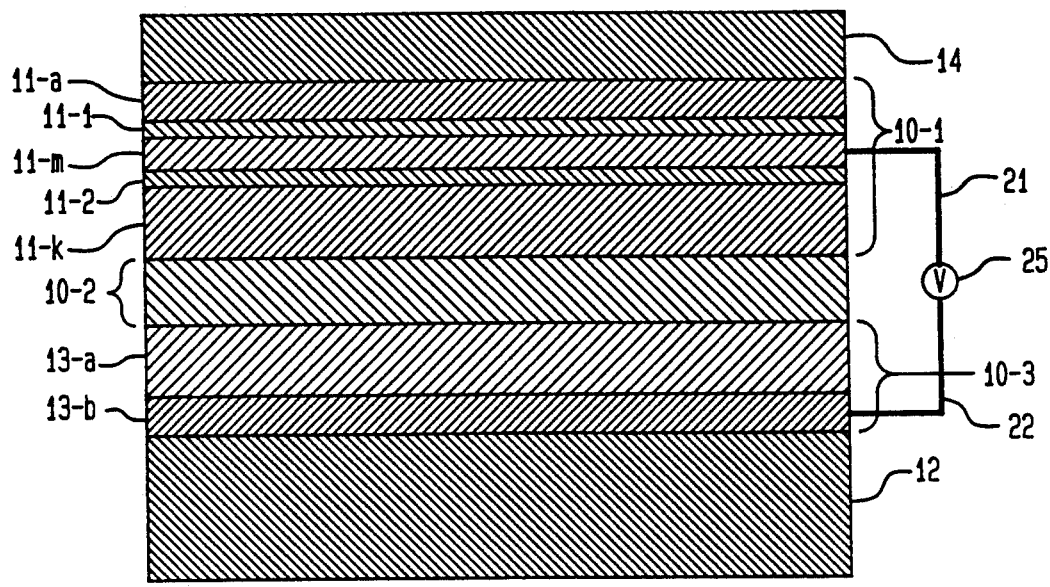
FIG. 1 is a cross-sectional view of an electrochromic device incorporating the constituent layers of the invention.

With reference to the drawings a cross-section of a window 10 in accordance with the invention is shown in FIG. 1.

The window 10 is electrochromic in the sense that the transparency of the area exposed to external illumination or radiation is controlled electrically or electronically. For that purpose the occupant of a room or compartment containing the window can operate electrical controls in the manner described in detail below in order to achieve a desired degree of darkness or lightness. It will be appreciated that although the invention is illustrated in terms of a window, it is equally applicable to other areas that admit illumination into the interior of a room or compartment, i.e., vision applications. By virtue of electrical control, the transparency of a window, for example, can be adjusted as desired.

As shown in the cross-sectional view of FIG. 1, the window 10 of FIG. 1 includes constituents 10-1 through 10-3. It will be appreciated that the size of the window is relative, and that very large electrochromic structures can be realized in accordance with the invention.

The constituents 10-1 through 10-3 of FIG. 1 are mounted on a base or substrate 12 and are adhered to the substrate 12 in suitable fashion. A convenient medium (not shown) can be a laminating transparent adhesive such as ethylene vinylacetate or polyvinylbutyral.

Alternatively, the constituents 10-1 through 10-3 may be adhered to the substrate 12 by a dipping technique in which the materials of the various layers are dissolved in an organic solvent and reacted as desired, after which the solvent is evaporated to form a precipate which is heated to realize the desired layer In this way successive layers can be formed.

The cross-section of FIG. 1 also illustrates the substituent layers of the constituents 10-1 through 10-3 of the window 10.

The constituent 10-1 is a layered index-adjusted structure include a transparent oxide 11-$a$, a contact electrode 11-$m$ and an active electrochromic layer 11-$b$ for the window 10. In effect, the contact electrode 11-$m$ is embraced between the transparent oxide 11-$a$ and the electrochromic layer 11-$b$. Also included are thin metallic layers 11-1 and 11-2 which sandwich the contact electrode 11-$m$.

The purpose of the transparent oxide is to admit radiation and to enhance the transmission of radiation through the contact electrode and the electrochromic structure, while the contact electrode carries electrical charge into and out of the electrochromic device. Thus, by selecting a transparent oxide having a high refractive index, the transmission of radiation through the contact electrode and the electrochromic structure can be improved. Suitable oxides in this regard are doped zinc oxide, tungsten oxide, nickel oxide, cobalt oxide and indium tin oxide. Generally, the higher the refractive index of the transparent oxide, the greater the improvement in radiation transmission.

Included in the constituent 10-1 is an active electrochromic or colorant layer 11-$b$, illustratively of tungsten trioxide ($WO_3$). The colorant layer is optically active and permits the reversible flow of both positive ions and negative ions The layer's ability to change color and transmit light is a direct function of the number of ions and electrons contained in the layers. While tungsten trioxide is a standard electrochromic layer, other suitable layers include molybdenum trioxide, nickel oxide and iridium oxide, as well as mixed oxides of vanadium, tungsten, titanium and molybdenum.

Adjoining the colorant layer 11-$b$ of the structure 10-1 is a transparent and electrically insulating ion conductor layer 10-2, which isolates the electrochromic layer 11-$b$ of the structure 10-1 from the counterelectrode layer 13-$a$ of the index-adjusted structure 10-3, which also includes an underlying oxide layer 13-$b$ for improving radiation transmission.

The ion conducting layer 10-2 allows ions, but not electrons to pass through it and provides the device with "memory". There are many suitable ion conductor electrolytes including, but not limited to, lithium-based ceramics such as lithium silicate, lithium aluminum silicate, lithium niobate, lithium nitride and lithium aluminum fluoride Suitable hydrogen ion conductors are derived from tantalum pentoxide and silicon dioxide.

The counterelectrode layer 13-a of the structure 10-3 "inserts" and stores ions when they are not employed in the electrochromic layer of the structure 10-1. Some counterelectrode materials are also electrochromic in that they modulate incident radiation, including certain infrared and visible components of solar radiation. Such materials complement the modulation by the electrochromic layer in the structure 10-2. Suitable insertion compounds for the counterelectrode 13-a include vanadium pentoxide, niobium oxide, indium oxide, nickel oxide, cobalt oxide and molybdenum oxide, and mixed oxides.

Prior to completion of the window 10, at least one of the layers 13a or 11-b is inserted with lithium or hydrogen, unless there is already a source of lithium or hydrogen ions within one of these layers. The insertion may be accomplished by treating one or more of the constituents 10-1 and 10-3 with a suitable reducing agent. For example n-butyl lithium can be used for lithium insertion, or aqueous sulfuric acid can be used for hydrogen insertion. Alternatively, the insertion may take place in vacuum processing by sputtering from a target serving as a source of suitable ions, for example, a lithium target that decomposes to produce lithium atoms in the vapor phase. Additionally, a plasma may be used for the insertion, for example, a hydrogen plasma to produce hydrogen insertion. Another technique is vapor deposition using a source of the desired composition Another technique is electrochemical intercalation into one of the index-adjusted structures, for example, lithium intercalation into either the 10-1 or 10-3 constituent.

Another technique for ion insertion is to use a volatile species and ignite a discharge to dissociate the insertion ion from the precursor. Thus an organic lithium compound in the form of a precursor gas is caused to dissociate so that insertable lithium atoms come into contact with the material to be charged. It is desirable to use a species that will not react in the gas flow channel.

When the host material "intercalates" ions, for example lithium ions, the host intercalation compound accepts lithium ions and releases them when exposed to an electric field. The lithium ions exit into the ion conductor. Lithium ions in the ion conductor have to meet electrons going through the outside circuit. When the lithium ions and associated electrons are in the electrochromic insertion compound, for example tungsten trioxide, there is a change in optical properties.

Attached to the constituents 10-1 and 10-3 are respective leads 21 and 22 that extend to a control circuit 25 including a battery and a potentiometer for regulating the voltage applied to the window 10 through the leads 21 and 22. It is advantageous for the battery in the control circuit 25 to be rechargeable In addition, it is desirable for the window 10 to be used in conjunction with solar panels (not shown) by which the battery can be recharged during daylight hours.

When a voltage of low magnitude, typically a direct current voltage, is applied across the outer leads 21 and 22, charge compensating ions, such as lithium ions stored in the counterelectrode of the constituent 10-3, migrate due to the electric field between the electrodes of the constituents 10-1 and 10-3, with the result that positively charged ions are drawn by the field through the ion conducting layer 10-2 to the active electrochromic layer of the constituent 10-1.

In the active layer of the constituent 10-1, positively charged ions join with electrons supplied through the outer circuit. This combination in the electrochromic layer brings about a change in optical properties and makes the electrochromic layer light-absorbing. The amount of light absorbed, i.e., the degree of shading, is variable and is controlled by the number of ions and electrons injected in accordance with the magnitude and polarity of the applied voltage.

In addition, the device has "memory" so that when voltage is removed, shading remains for extended periods.

It will be appreciated that although the ion conductor layer 10-2 is desirably a lithium based inorganic film, a lithium or hydrogen ion conducting polymer electrolyte may be used in place of a solid inorganic electrolyte.

Figure 2:
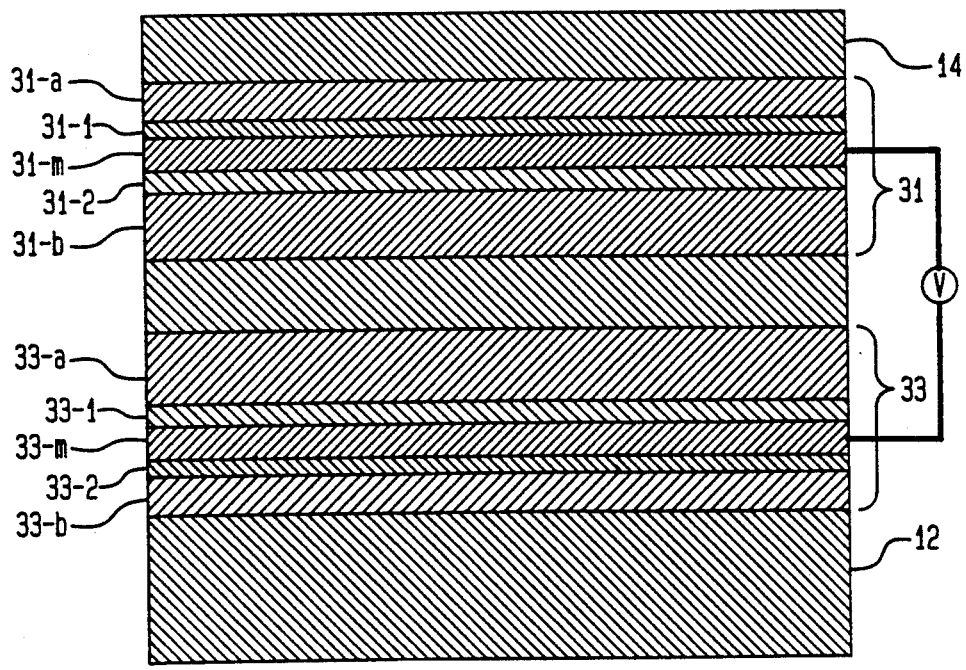
FIG. 2 is a cross-sectional view of an alternative electrochromic device incorporating constituent layers of the invention.

In order to achieve an advantageous current distribution for the device 10, the embodiment of FIG. 2 includes a modified constituent 33, corresponding to the constituent 10-3 of FIG. 1. The constituent 33 is also an index-adjusted structure consisting of combination of electrode and electrochromic or counterelectrode layers including a layered electrode formed by sandwiching a thin film of metal 33-m between thinner films of metal 33-1 and 33-2, such as nickel, iron, tungsten, zirconium or titanium. The resulting metal sandwich is further embraced between oxide films 33-a and 33-b of high refractive index. The metallio film 33-m provides electrical conductivity and reflectivity of incident energy in the near infrared region. A suitable metallic film 33-m is of silver, aluminum or copper. The high refractive index oxide films 33-a and 33-b improve the transmission of radiation through the metallic film 33-m.

As noted above, the thin-film sandwich metal layers 33-1 and 33-2 are of nickel, iron, tungsten, zirconium or titanium. The further embracing layers 33-a and 33-b may be of doped or undoped zinc oxide, tungsten oxide, indium tin oxide, nickel oxide and cobalt oxide, vanadium oxide, titanium oxide, molybdenum oxide, niobium oxide, iron ferrocyanide, and mixtures of two or more of the foregoing.

The remaining layered structure 31 of FIG. 2 corresponds to the index-adjusted structure 10-1 of FIG. 1. In addition, while the electrochromic layer 11-b of FIG. 1 was included in the component 10-1, and may correspond to the layer 31-b of FIG. 2, it will be appreciated that the layer 31-b may a counterelectrode, in which case the electrochromic layer of FIG. 2 becomes the layer 33-a.

In an illustrative embodiment of the invention, the metallic film 31-m has a refractive index less than 1.0, namely about 0.2, and the embracing oxide films 31-a and 31b have similar refractive indices on the order of 2.0

Similarly, the counterelectrode constituent 10-3 of FIG. 1 is now in the form of a thin film index-adjusted structure 33, as shown in FIG. 2 with a metallic layer 33-m embraced between oxide layers 33-a and 33-b.

In the fabrication of the device 10 of FIG. 1, one technique is to coat the substrate 12 with successive films that can be deposited, for example, by reactive sputtering from a metal or metal-alloy target using a rotatable magnetron cathode to sputter deposit the material. Alternative thin film deposition techniques include thermal evaporation, sol-gel, chemical vapor deposition (CVD) and plasma enhanced CVD.

In forming, for example, the layered electrode 31 by magnetron sputtering, the deposition of doped or undoped metal oxide layer 31-b takes place using a metal or alloy target. This is followed by the deposition of a thin layer (less than 50 angstroms) of metal 31-2 to obtain a suitable nucleation surface for the subsequent deposition of an electrically conducting metal 31-m. The latter is deposited as a continuous film of less than 300 angstroms. This is followed by deposition of a protective metallic layer 31-1 to preserve the electrically conducting layer from exposure to oxygen plasma in subsequent oxide deposition. The protective metallic layer can be used for the partial formation of oxide, which is supplemented by the deposition of another doped or undoped oxide layer, for example, the ZnO or $TiO_2$ layer 31-a.

To form the ion conducting layer 10-2, a deposition is made of an amorphous lithium silicate containing elements such as aluminum or titanium to increase ionic conductivity. For example, a substrate with the layers of constituent 10-3 or constituent 33 is dipped into a solution formed by mixing alkoxides of silicon and alkoxides and/or salts of lithium, in alcohol or water. The solution may contain salts or alkoxides of aluminum or titanium. The substrate is then withdrawn from the solution at a controlled rate. After removal of the substrate, a thin film remains which is completed by simultaneous hydrolysis and drying, followed by annealing.

The device is completed with the layers of constituent 10-1, or constituent 31, by sputtering upon the ion conducting layer 10-2, with lithium added to the counterelectrode film 31-b by simultaneous or sequential sputtering from a lithium containing target such as lithium carbonate. A thin layer of metal 31-2, such as nickel in which lithium solid has low solubility, is deposited to prevent the lithium in the counterelectrode from diffusing into and reacting with the electrically conducting metallic layer. In the next step, an electrically conducting metallic layer, for example silver, is deposited, followed by deposition of a protective layer of metal 31-1 and the oxide film 31-a.

The electrode contacts 21 and 22 are made by masking and deposition of a low resistance metal such as copper. In addition, a "capping" layer, for example of silicon nitride, is formed by sputtering. In practice, the device 10 is on a substrate that is laminated to a second superstrate 14 of the same size and shape of the substrate, with an edge sealant applied to eliminate contact with air and moisture.

What is claimed:

1. An electrochromic device, comprising
   an electrochromic structure including an electrode formed from an electrochromic material, a counterelectrode, and transporting means for transporting ions between said electrode and said counterelectrode,
   conductive means including at least one layer of an electrically conductive metal for applying an electric potential across said electrochromic structure,
   optical means for enhancing the transmission of optical radiation through said electrochromic structure and said at least one electrically conductive metal layer, and
   a first intermediate layer formed from a metal and disposed between said electrochromic structure and said at least one electrically conductive metal layer.

2. An electrochromic device as claimed in claim 1, wherein said metal forming said first intermediate layer is selected from the group consisting of nickel, iron, tungsten, zirconium and titanium.

3. An electrochromic device as claimed in claim 1, wherein said first intermediate layer is thinner than said at least one electrically conductive metal layer.

4. An electrochromic device as claimed in claim 3, wherein said first intermediate layer has a thickness of less than about 50 angstroms.

5. An electrochromic device as claimed in claim 1, wherein said electrically conductive metal is selected from the group consisting of silver, aluminum and copper.

6. An electrochromic device as claimed in claim 1, wherein said at least one electrically conductive metal layer has a thickness of less than about 300 angstroms.

7. An electrochromic device as claimed in claim 1, further comprising a second intermediate layer disposed in surface contact with said at least one electrically conductive metal layer so that said at least one electrically conductive metal layer is sandwiched between said first and second intermediate layers.

8. An electrochromic device as claimed in claim 7, wherein said first and second intermediate layers are each formed from a layer or metal which is thinner than said at least one electrically conductive metal layer.

9. An electrochromic device as claimed in claim 8, wherein said metals forming said first and second intermediate layers are different than said electrically conductive metal.

10. An electrochromic device as claimed in claim 1, wherein said optical means comprises at least one layer of an optically transparent material in surface contact with said at least one electrically conductive metal layer.

11. An electrochromic device as claimed in claim 10 wherein said optically transparent material comprises a transparent oxide.

12. An electrochromic device as claimed in claim 11, wherein said optically transparent material is selected from the group consisting of doped zinc oxide, undoped zinc oxide, tungsten oxide, nickel oxide, cobalt oxide, vanadium oxide, titanium oxide, molybdenum oxide, niobium oxide, indium tin oxide, and mixtures thereof.

13. An electrochromic device as claimed in claim 11, wherein said optically transparent material comprises an electrically conductive oxide.

14. An electrochromic device as claimed in claim 10, wherein said optically transparent material has an index of refraction of about 2.0.

15. An electrochromic device as claimed in claim 1, wherein said transporting means includes at least one layer formed from an ion conducting material sandwiched between said electrode and said counterelectrode.

16. An electrochromic device as claimed in claim 15, wherein said ion conducting material comprises a lithium ion conducting lithium-based ceramic material.

17. An electrochromic device as claimed in claim 16, wherein said ion conducting material is selected from the group consisting of lithium silicate, lithium borate, lithium borosilicate, lithium zirconium silicate, lithium aluminum silicate, lithium niobate, lithium nitride and lithium aluminum fluoride.

18. An electrochromic device as claimed in claim 15, wherein said ion conducting material comprises a hydrogen ion conducting material.

19. An electrochromic device as claimed in claim 18, wherein said ion conducting material is selected from the group consisting of tantalum pentoxide and silicon dioxide.

20. An electrochromic device as claimed in claim 15, wherein said ion conducting material comprises a polymer.

21. An electrochromic device as claimed in claim 15, wherein said ion conducting material includes a second material for enhancing ion conductivity.

22. An electrochromic device as claimed in claim 21, wherein said second material is selected from the group consisting of aluminum and titanium.

23. An electrochromic device as claimed in claim 1, wherein said electrochromic material is selected from the group consisting of tungsten oxide, molybdenum oxide, nickel oxide, iridium oxide and mixed oxides of vanadium, tungsten, titanium and molybdenum.

24. An electrochromic device as claimed in claim 1, wherein said counterelectrode is formed from a material selected from the group consisting of vanadium oxide, niobium oxide, indium oxide, iridium oxide, nickel oxide, cobalt oxide, molybdenum oxide and mixtures thereof.

25. An electrochromic combination, comprising a transparent substrate, and an electrochromic device arranged on said transparent substrate, said electrochromic device comprising an electrochromic structure including an electrode formed from an electrochromic material, a counterelectrode, and transporting means for transporting ions between said electrode and said counterelectrode, conductive means including at least one layer of a conductive metal for applying an electric potential across said electrochromic structure, optical means for enhancing the transmission of optical radiation through said electrochromic structure and said at least one electrically conductive metal layer, and an intermediate layer formed from a metal and disposed between said electrochromic structure and said at least one electrically conductive metal layer.

26. An electrochromic combination as claimed in claim 25, further comprising a transparent superstrate, wherein said electrochromic device is sandwiched between said transparent substrate and said transparent superstrate.

27. An electrochromic combination as claimed in claim 26, further comprising a layer of an adhesive material for binding said transparent superstrate to said electrochromic device.

28. An electrochromic combination as claimed in claim 27, wherein said adhesive is selected from the group consisting of ethylene vinylacetate and polyvinyl butyral.

* * * * *

UNITED STATES PATENT AND TRADEMARK OFFICE
CERTIFICATE OF CORRECTION

PATENT NO. : 5,321,544
DATED : June 14, 1994
INVENTOR(S) : Parkhe et al.

It is certified that error appears in the above-indentified patent and that said Letters Patent is hereby corrected as shown below:

```
Column 4, line 25, after "layer", insert --.--.
Column 4, line 31, "include" should read --including--.
Column 4, line 55, after "ions", insert --.--.
Column 5, line 16, "10-2" should read --10-1--.
Column 5, line 36, after "composition", insert --.--.
Column 5, line 52, after "When", delete "the".
Column 5, line 61, after "rechargeable", insert --.--.
Column 8, line 31, "or" should read --of--.
```

Signed and Sealed this

Twenty-seventh Day of September, 1994

Attest:

BRUCE LEHMAN

Attesting Officer

Commissioner of Patents and Trademarks